(12) United States Patent
Gosselin

(10) Patent No.: US 7,698,966 B2
(45) Date of Patent: Apr. 20, 2010

(54) CONTROL MEMBER WITH TENSED CABLES

(75) Inventor: Florian Gosselin, Fontenay aux Roses (FR)

(73) Assignee: Commissariat A l' Energie Atomique, Paris (FR)

( * ) Notice: Subject to any disclaimer, the term of this patent is extended or adjusted under 35 U.S.C. 154(b) by 1529 days.

(21) Appl. No.: 10/496,595

(22) PCT Filed: Dec. 6, 2002

(86) PCT No.: PCT/FR02/04208

§ 371 (c)(1),
(2), (4) Date: May 21, 2004

(87) PCT Pub. No.: WO03/050639

PCT Pub. Date: Jun. 19, 2003

(65) Prior Publication Data

US 2005/0016316 A1 Jan. 27, 2005

(30) Foreign Application Priority Data

Dec. 10, 2001 (FR) ................................. 01 15913

(51) Int. Cl.
*B25J 17/02* (2006.01)
(52) U.S. Cl. ................................................. 74/490.06
(58) Field of Classification Search ................ 74/500.5, 74/501.5 R, 502.4, 501.6, 490.06, 490.01
See application file for complete search history.

(56) References Cited

U.S. PATENT DOCUMENTS

| | | | |
|---|---|---|---|
| 3,893,449 A | 7/1975 | Lee et al. | |
| 4,666,362 A * | 5/1987 | Landsberger et al. | 414/735 |
| 4,820,162 A | 4/1989 | Ross | |
| 4,928,546 A * | 5/1990 | Walters | 74/490.06 |
| 5,228,356 A | 7/1993 | Chuang | |
| 5,279,176 A * | 1/1994 | Tahmasebi et al. | 74/490.01 |
| 5,313,854 A * | 5/1994 | Akeel | 74/490.04 |
| 5,454,827 A * | 10/1995 | Aust et al. | 606/170 |
| 5,797,900 A * | 8/1998 | Madhani et al. | 606/1 |
| 5,828,813 A * | 10/1998 | Ohm | 700/260 |
| 6,330,837 B1 * | 12/2001 | Charles et al. | 74/490.06 |
| 6,394,998 B1 * | 5/2002 | Wallace et al. | 606/1 |
| 6,685,698 B2 * | 2/2004 | Morley et al. | 606/1 |
| 2003/0100892 A1 * | 5/2003 | Morley et al. | 606/1 |

OTHER PUBLICATIONS

Masahiro Ishii andMakoto Sato, "A 3D Interface Device wit Force Feedback: A Virtual Work Space for Pick-and-Place Tasks", Precision and Intelligence Laboratory, Tokyo Institute of Technology 1993 IEEE, pp. 331-335.

* cited by examiner

*Primary Examiner*—Vicky A Johnson
(74) *Attorney, Agent, or Firm*—Pearne & Gordon LLP

(57) ABSTRACT

The control unit includes an arm (21) sliding inside of a sheath (20) the angle of which can be varied and which is supported by three tensed cables (25; 26; 27) arranged in a triangle and unwinding with a certain degree of resistance from force feedback motors (16; 17; 18). The wrist (23) of the control unit can be moved according to at least the three degrees of translational freedom, without having to be afraid of encountering the cables; the control unit is simple, inexpensive and possesses a satisfactory degree of stiffness. A friction-creating means, possibly consisting of another tensed cable and dependant on a motor, is placed between the sheath (20) and the arm (21).

This unit can be used for telemanipulation, telesurgery, CAD, games, etc.

20 Claims, 3 Drawing Sheets

CONTROL MEMBER WITH TENSED CABLES

The subject of this invention is a control unit one essential element of which is a set of tensed cables.

The known control units or master arms used in various fields rely on different mechanisms. Arms consisting of successive articulated sections have thus been proposed, which, however, possess a certain degree of complexity, a significant degree of inertia, and kinematic singularities that limit the movements that can be imposed on them. This is why other types of units have again been proposed.

Thus, a known control unit includes a thimble-shaped operating device into which the user inserts a distal phalanx, and that is suspended from four tensed cables which, in the embodiment proposed by the authors, are unwound from the vertices of a regular tetrahedron, or else over four of the vertices of a cube, always diametrically opposite each other on the faces of the cube. The force feedback motors, which ensure tensioning of the cables, are arranged at these vertices. By moving the thimble, the user varies the unwound lengths of the cables, and the corresponding measurements make it possible to perform the desired control. This mechanism is simple and easy to use, but has the disadvantage of being cumbersome, the cables running in every direction from the thimble.

The invention proposes a novel control unit arrangement whose structure is simple and inexpensive and that can be easily endowed with a sufficient degree of stiffness. In its more general shape, the control unit of the type with tensed cables, arranged between a generally stationary base and a movable wrist and equipped with an element grasped by the operator, is characterized in that it includes: a sheath joined to the base by a double joint; three actuating cables between the sheath and the base and connecting to the base at the same number of connecting points surrounding the sheath; an arm supporting the wrist, sliding into the sheath; and an actuating means between the arm and the sheath. Within the meaning of the invention, the cables and actuating means ensure the active control of the movements of the unit, i.e., that their free length, or more generally their condition, is variable, but that they maintain the unit in a fixed position at rest and exert a certain resistance to the movements of the unit imposed by the user, in order to give the unit a degree of stiffness that enables a more pleasant and accurate control. The conventional means in this technology consist of a so-called force feedback motor, most often equipped with an encoder that measures its movements and transmits them to the machine controlled by the unit, in order to thus also contribute to the control.

Figure 1:
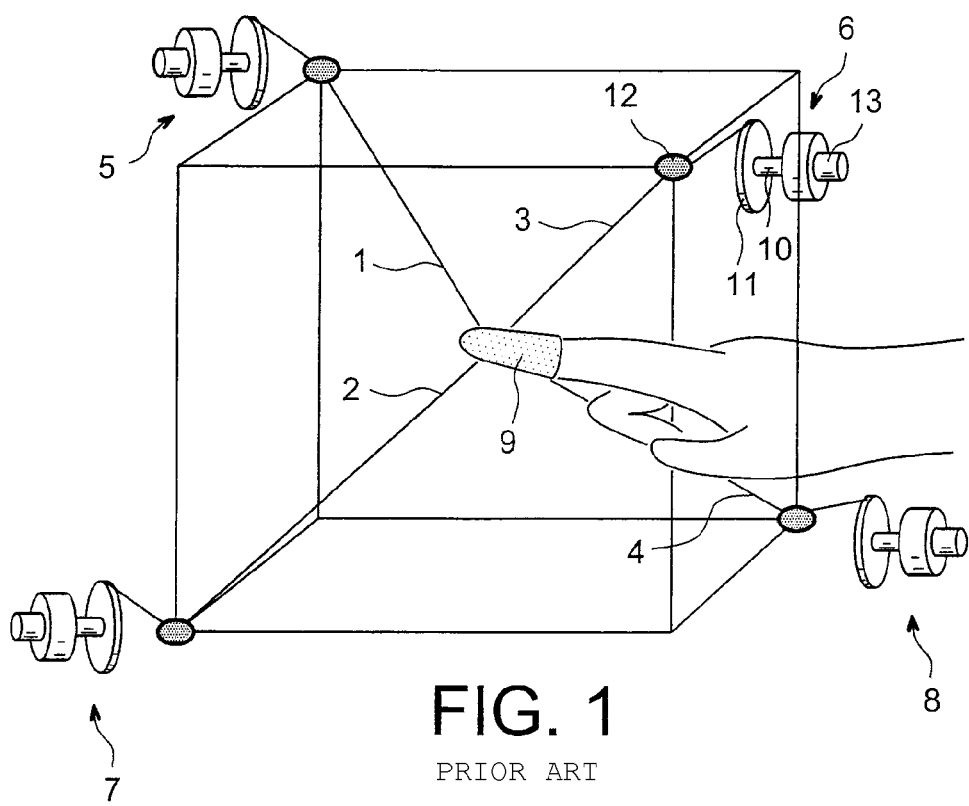
Figure 2:
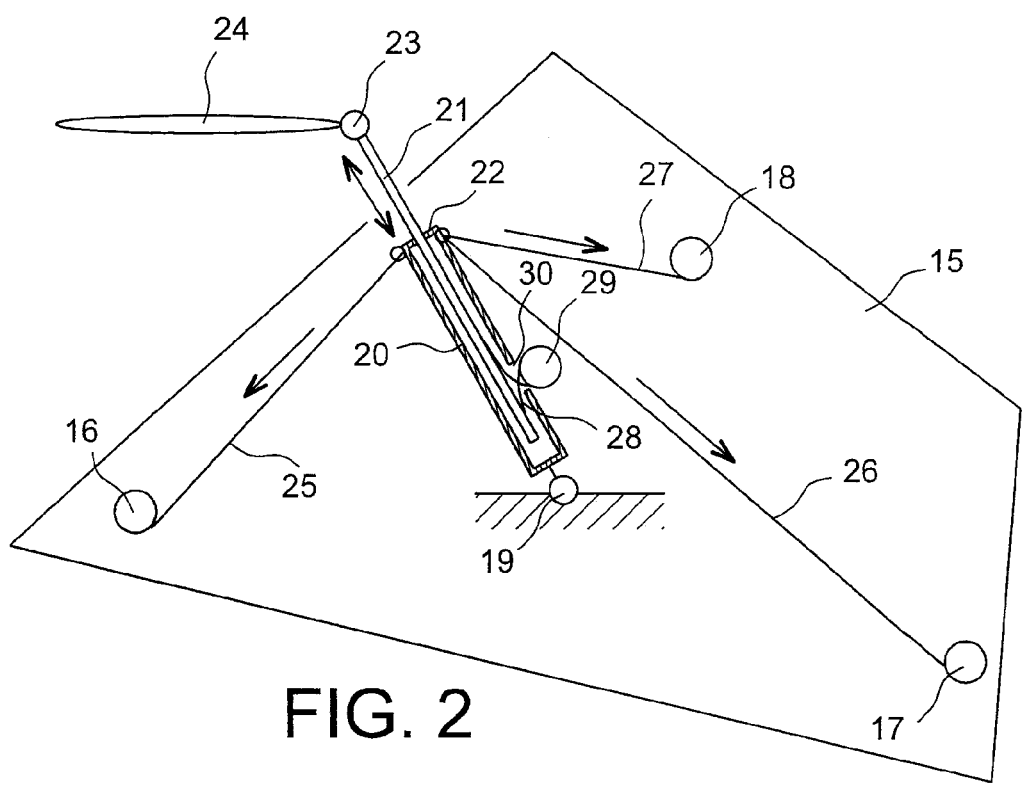
Figure 2A:
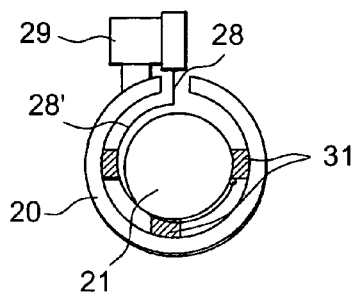
Figure 2B:
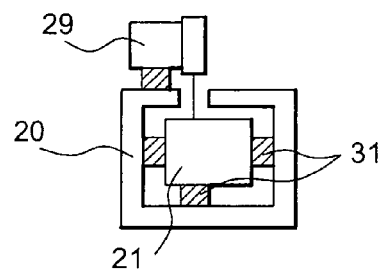

The invention will now be described in detail by means of the following figures:

FIG. 1 shows the previously described known control unit with cable;

the four FIGS. 2, 3, 4, and 5 show as many embodiments of the invention, and FIGS. 2A and 2B are two sections through the unit in the embodiment of FIG. 2, according to two alternative embodiments.

FIG. 1, therefore, shows four similar cables 1 to 4 unwinding from respective motors 5 to 8 placed at the corners of a regular tetrahedron and all positioned on a stationary base not shown. The cables 1 to 4 converge towards a thimble 9 into which an operator inserts his finger and that he moves to the desired position by varying the unwound lengths of the cables 1 to 4. A system such as this is described more fully in the article "A 3D Spatial Interface Device Using Tensed Strings," by Ishii and Sato, published in the journal "Presence" (Volume 3, Number 1, Winter 1994, pages 81-86). The authors also mention that it is possible to improve this system by splitting it into two within the same space and by installing another thimble whose cables would be unwound from motors placed at the four unoccupied vertices of the cube and into which the operator would insert another finger of his hand, in particular the thumb.

The arrangement of the four motors is identical: in this way, the motor 6 (the only one shown completely) includes an output shaft 10 that rotates a pulley 11 inside of which the cable 3 is wound; the cable 3 passes through a die 12 (at the vertex of the tetrahedron) that gives it a fixed point, and an angle encoder 13 is connected to the output shaft 10 in order to follow its movements and communicate them to the machine controlled by the unit.

In the first embodiment of the invention of FIG. 2, the base of the control unit bears the reference 15; it is planar and holds three actuating motors 16, 17, 18 analogous to the motors already encountered, as well as a double joint 19 connected to a sheath 20. An arm 21 slides into the sheath 20 and exits therefrom via an open end 22 thereof, which is opposite the double joint 19. The free end of the arm 20 supports a wrist 23, i.e., a double or triple joint that makes it possible to tilt an element held by the operator, such as a pen 24 in any direction, and to possibly rotate it. Associated with the motors 16, 17 and 18 are cables 25, 26 and 27 that are stretched from a connection point at the base 15, capable of being formed by a known die, such as 12, to the open end 22 of the sheath 20, whereon they are hooked while forming a network of pyramid edges. A fourth cable 28 exists, housed inside the sheath 20 and running along the arm 21, onto which it is hooked by its ends. However, it forms a loop at a location where it is wound around a pulley of a fourth motor 29 fastened to the sheath 20, on its exterior face, while passing through a slot 30 of the sheath 20 perforated at this location. It is seen that the fourth cable 28, stretched between the sheath 20 and the arm 21, and its motor 29 together form an actuating means between the sheath 20 and the arm 21. Skids 31 or any other suitable means, visible in FIG. 2B, are arranged between the sheath 20 and the arm 21 to enable a guided sliding movement.

The system consisting of the cables of the sheath 20 and the arm 21 is a control unit with three degrees of freedom, i.e., it makes it possible to place the wrist 23 at any point of a workspace. The motors 16 to 18 and 29 and the cables 25 to 28 make it possible to maintain the control unit at the position that it reached while at the same time imposing a stiffness satisfactory to the user during movements. The first three cables 25, 26, and 27 maintain the sheath 20 and the arm 21 on the base 15, at the angle that was given to them according to the two first degrees of freedom of the unit, and the fourth cable 28 maintains the degree of insertion given to the arm 21 inside the sheath 20 according to the third degree of freedom of the unit. As already mentioned, the wrist 23 may also be equipped with force feedback motors that make it possible to control additional degrees of freedom related to the angle of the pen 24. It may also become useful to permit rotation of the arm 21. The sheath 20 might then rotate together with the arm 21 by replacing the double Cardan joint 19, which only makes it possible to adjust the angle of the sheath 20 on the base 15, with a triple ball joint. In order to prevent rotating movements of the arm 21 inside the sheath 20, and damage to the cable 28, it is anticipated to give them the polygonal sections illustrated in FIG. 2B.

On the other hand, FIG. 2A shows an alternative embodiment where the sheath 20 and an arm 21 have circular concentric sections in order to enable the arm to rotate; if, depending on this rotation, a force feedback is desired, the fourth cable 28, at one end at least, may be wound around the arm 21, ahead of the skids 31. It comprises at least one turn 28' at this location. In this way, one degree of freedom has been added. Translational and rotational force feedback movements can also be obtained by using an additional motor.

Figure 3:
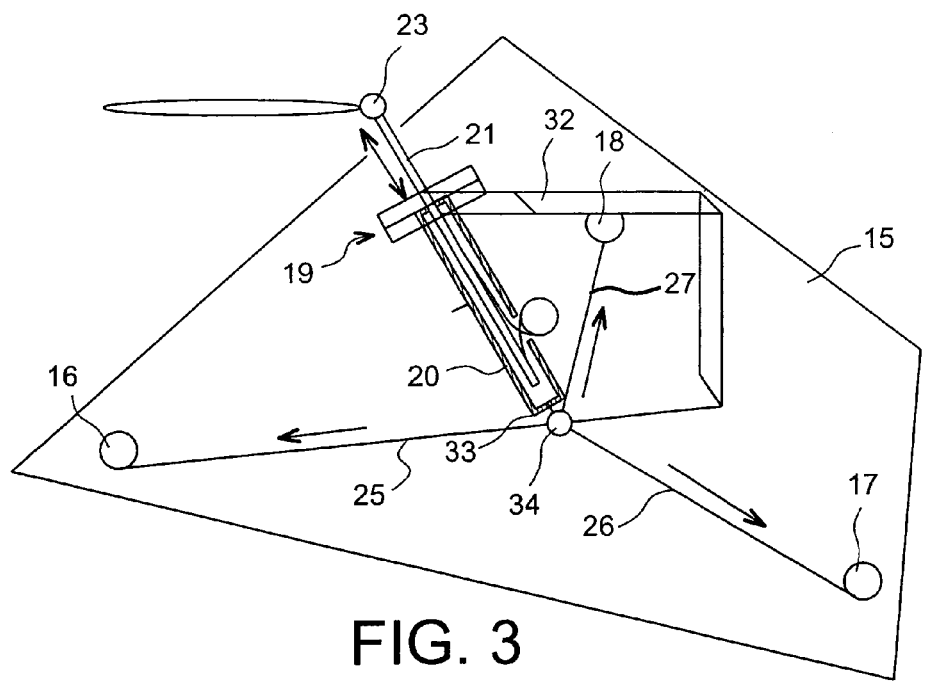

In this embodiment, the space intended for the user is very open since all of the cables run beneath it; but the control stiffness remains somewhat poor, which justifies the somewhat different arrangement of FIG. 3. In this case, the double joint 19 (or the ball joint) and the points for hooking up the first three cables 25, 26 and 27 to the sheath 20 have been transposed, i.e., the double joint 19 is now near the open end 22 of the sheath, hooked onto a gallows-like support 32 of the base 15, and the lower end 33 of the sheath 20 supports a hook-up point 34 for the cables 25, 26 and 27, which are now substantially coplanar. It is immediately apparent that the stresses exerted by the user on the wrist 23 produces a smaller moment since the lever arm is reduced to the free length of the arm 21, and the resistance of the motors 16 to 18 is more difficult to overcome. Furthermore, the angle of the sheath 20 and of the cables 25 to 27 is generally greater than in the previous embodiment, with the result being that their tension exerts a greater moment. These two differences give a greater degree of stiffness to the control unit. It shall also be noted that greater angular tilting movements might possibly be communicated to the wrist 23, and that the workspace is more open due to the greater distance of separation between the first three cables 25 to 27 and the wrist 23. It is also possible to place the motors 16 to 18 above the end 33, which permits greater rotational travel at the cost of larger overall dimensions.

Figure 4:
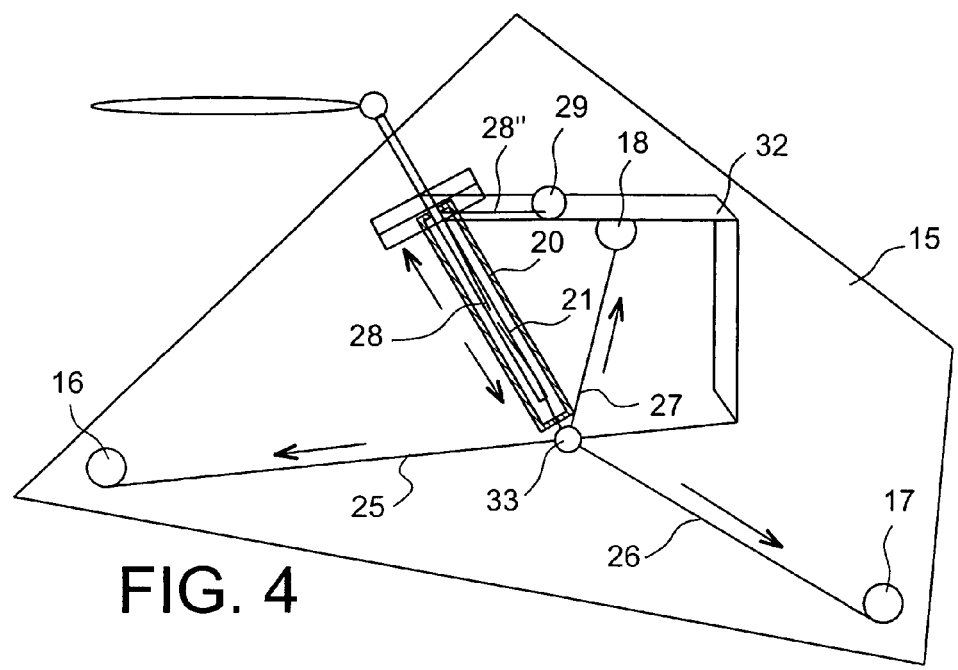

In the embodiment of FIG. 4, the overall design of FIG. 3 has been taken up again, but the fourth motor 29 is no longer situated on the sheath 20 but on the support 32, and only one end of the fourth cable 28 runs over the arm 21 and is hooked on to it; the add-on piece 28" of the cable extends over the support 32 up to the motor 29 from where it unwinds. Furthermore, one of the first three cables, e.g., 27, extends beyond the fastening device 33 and enters into the sheath 20, and its end is hooked on to the arm 21. Thus, upon extension of the arm 21, the stiffness is produced by the motor 18 of this cable 27, and the insertion stiffness of the arm 21 is produced by the motor 29 of the fourth cable 28. As before, the motor 18, like the motors 16 and 17, also serves to react to the angular movements of the sheath 20.

Another embodiment not shown uses a cable attached at both of its ends to the arm 21 as in FIGS. 2 and 3, with a motor set off-center on the support 32, as in FIG. 4.

Figure 5:
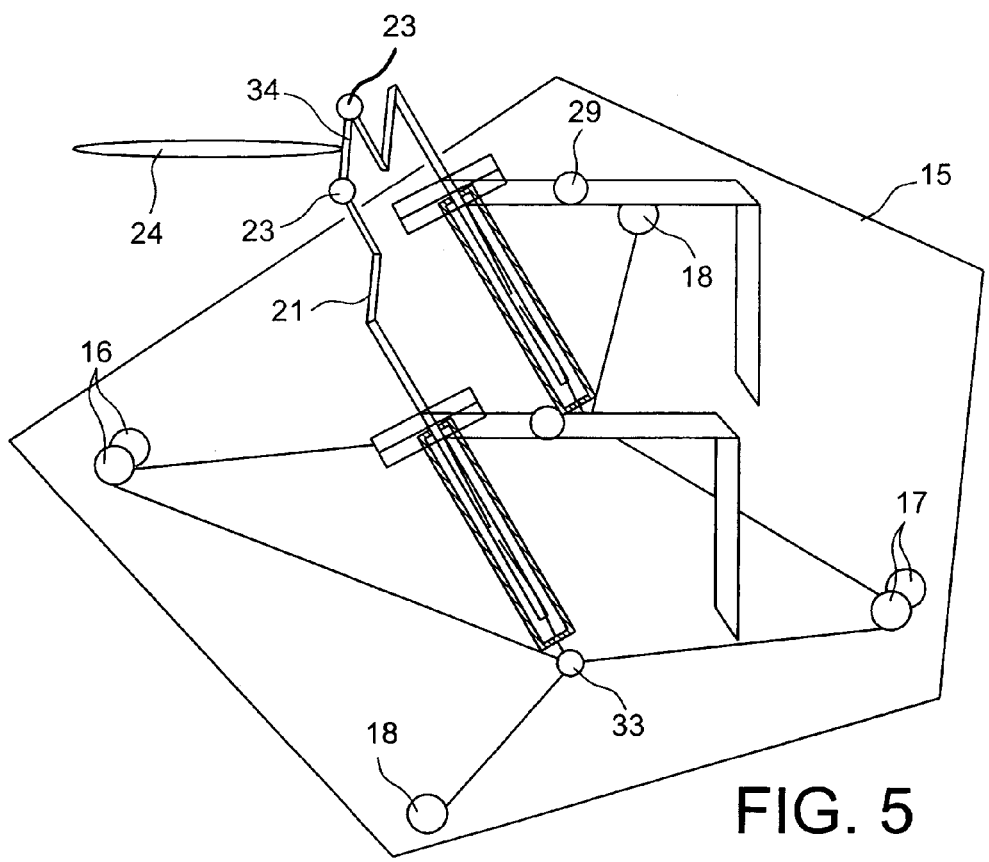

FIG. 5 shows a composite unit consisting of a pair of control units of the invention (e.g., as in FIG. 4), the two arms 21 being substantially parallel and their wrists 23 being joined by a connecting rod 34 holding the pen 24. The control unit made in this way has five degrees of freedom, without having to use a wrist with a complicated structure, as for the previous embodiments. It is to be noted that the two basic units may be rather close together without producing any large risk of singularity.

Therefore, the control unit proposed here offers a particularly simple structure. It can be applied to the primary traditional or developing fields of master arm control, such as telemanipulation, telesurgery, games, computer-assisted design, etc.

The invention claimed is:

1. Control unit with tensed cables arranged between a base (15) and a movable wrist (23), wherein the control unit includes: a sheath (20) joined to the base by a double joint (19); three actuating cables (25, 26, 27) between the sheath and the base and connecting to the base at the same number of connecting points surrounding the sheath; an arm (21) supporting the wrist (23), sliding into the sheath; and an actuating means (28, 29) between the arm and the sheath.

2. Control unit as claimed in claim 1, characterized in that the actuating means includes a cable (28) stretched between the sheath (20) and the arm (21) and controlled by a motor (29), and in that the three cables stretched between the sheath (20) and the base (15) are controlled by respective motors (16, 17, 18).

3. Control unit as claimed in claim 1, characterized in that the actuating means includes a cable (28) stretched between the arm (21) and the base (32) and controlled by a motor placed on the base, in that the three cables stretched between the sheath and the base are controlled by respective motors, and one of the three cables extends beyond the sheath to a fastening point on the arm.

4. Control unit as claimed in claim 1, characterized in that the three cables (25, 26, 27) are arranged like the edges of a pyramid, and the double joint (19) is surrounded by the connecting points of the cables to the base.

5. Control unit as claimed in claim 1, characterized in that the three cables are substantially coplanar and the double joint (19) is placed at a location of the sheath (20) from which the arm (21) exits.

6. Control unit as claimed in claim 1, characterized in that the double joint is a ball joint.

7. Control unit as claimed in claim 1, characterized in that the arm is capable of being rotated inside the sheath.

8. Composite control unit, characterized in that it includes a pair of units according to any of the preceding claims, the base being common to the units, the arms being joined to a common wrist by ball joints.

9. Control unit as claimed in claim 1, wherein the cables extend outside and around the sheath, at non-zero angles with the sheath.

10. Control unit as claimed in claim 1, wherein the double joint is a Cardan joint.

11. Control unit with tensed cables arranged between a base and a movable wrist including:
   a sheath joined to the base by a double articulation joint;
   first, second, and third actuating cables provided between the sheath and the base,
   wherein the first, second, and third cables are hooked to the sheath at a first end thereof and delivered from first, second, and third motors at an opposite end thereof,
   wherein the first, second, and third motors are connected to the base at a same number of connecting points surrounding the sheath;
   an arm supporting the wrist, wherein the arm is slidable into the sheath, the first, second, and third cables having diverging directions from the sheath; and
   an actuating means between the arm and the sheath.

12. Control unit of claim 11, wherein the actuating means includes a fourth cable stretched between the sheath and the arm and controlled by a fourth motor, and
   wherein the first, second, and third cables stretched between the sheath and the base are controlled by the respective first, second, and third motors.

13. Control unit of claim 11, wherein the actuating means includes a fourth cable stretched between the arm and the base and controlled by a motor placed on the base, and wherein one of the first, second, and third cables extends beyond the sheath to a fastening point on the arm.

14. Control unit of claim 11, wherein the first, second, and third cables are arranged like edges of a pyramid, and the double articulation joint is surrounded by the connecting points of the first, second, and third cables to the base.

15. Control unit of claim 11, wherein the first, second, and third cables are substantially coplanar and the double articulation joint is placed at a location of the sheath from which the arm exists.

16. Control unit of claim 11, wherein the double articulation joint is a ball joint.

17. Control unit of claim 11, wherein the arm is capable of being rotated inside the sheath.

18. A composite control unit comprising a pair of units according to any of the preceding claims, the base being common to the units, the arms being joined to a common wrist by ball joints.

19. Control unit as claimed in claim 11, wherein the cables extend outside and around the sheath, at non-zero angles with the sheath.

20. Control unit as claimed in claim 11, wherein the double joint is a Cardan joint.

* * * * *